Sept. 24, 1968
R. H. BAKER
3,402,605
MEASUREMENT OF CURRENTS IN LIQUIDS
Filed Dec. 9, 1965
3 Sheets-Sheet 1
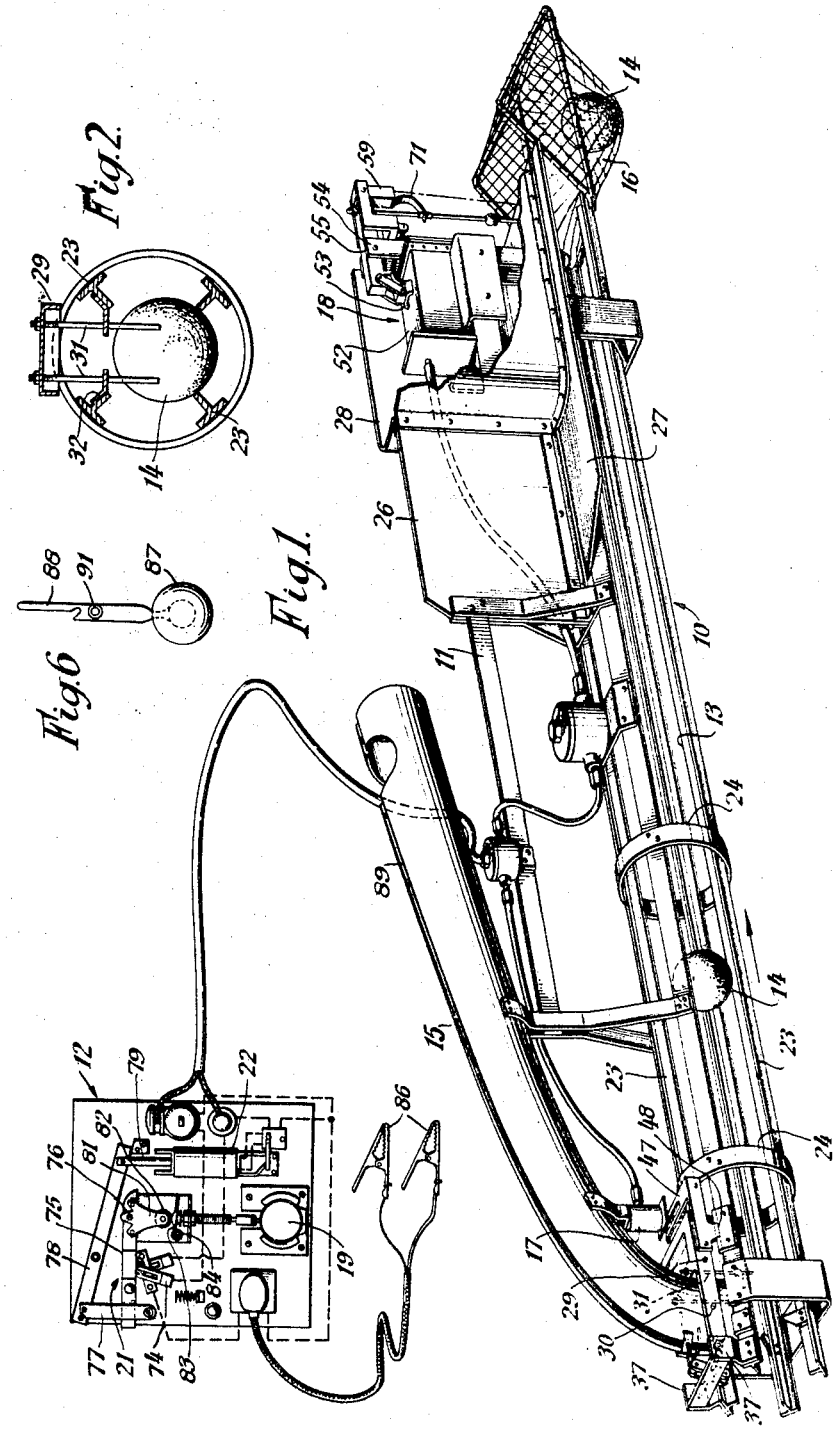
INVENTOR
Randolph H. Baker
BY Sparrow and Sparrow
ATTORNEYS Sept. 24, 1968  R. H. BAKER  3,402,605
MEASUREMENT OF CURRENTS IN LIQUIDS
Filed Dec. 9, 1965  3 Sheets-Sheet 2
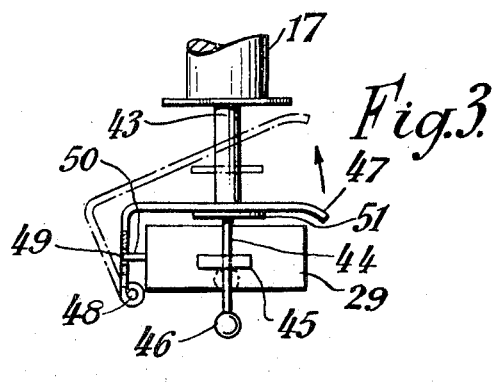
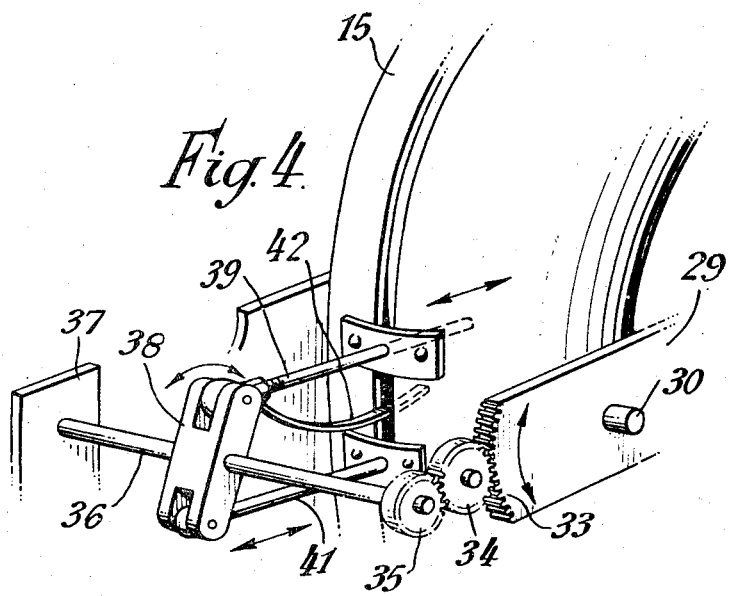
INVENTOR
Randolph H. Baker
BY
Sparrow and Sparrow
ATTORNEYS

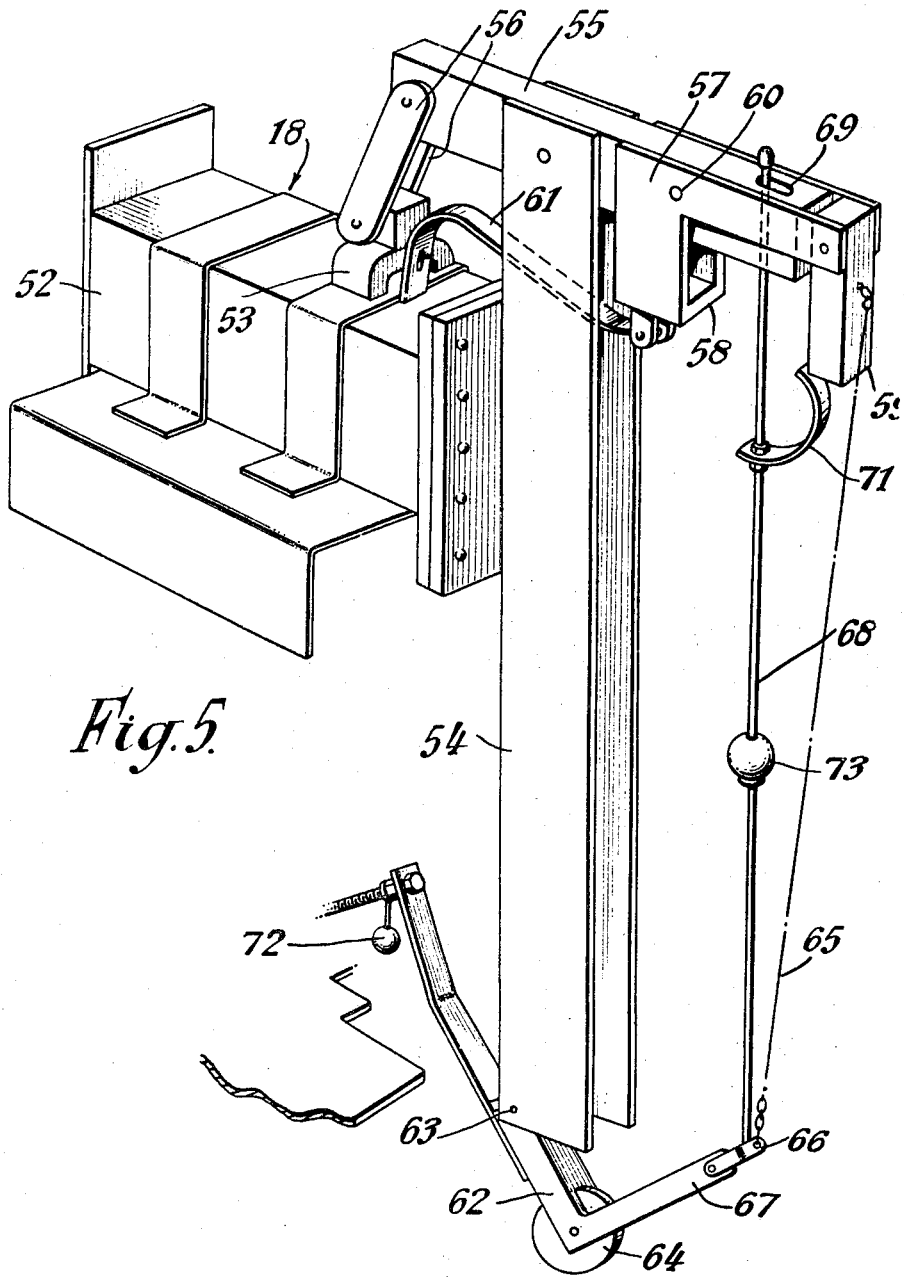

United States Patent Office 3,402,605
Patented Sept. 24, 1968

3,402,605
MEASUREMENT OF CURRENTS IN LIQUIDS
Randolph H. Baker, Efford Lodge, Plymouth Road,
Crabtree, Plymouth, Devonshire, England
Filed Dec. 9, 1965, Ser. No. 522,999
9 Claims. (Cl. 73—194)

ABSTRACT OF THE DISCLOSURE

Apparatus for measuring the rate of flow of liquid by releasing movable bodies one-by-one at the upstream end of a straight guide path held horizontal and aligned with the direction of liquid flow and measuring the time taken by them to traverse the guide path.

---

This invention relates to the measurement of currents in liquids, especially water, and has for its object to provide an improved method of and apparatus for measuring such currents.

According to the invention, a method of measuring the rate of flow of a liquid current comprises the steps of releasing a body of substantially the same specific gravity as the liquid to travel along guide means oriented so as to lie in the direction of flow of the current and measuring the time taken for the said body to travel a predetermined distance from the point of release.

The body is preferably released by means which also act to set a timer in operation, the body, after travelling a predetermined distance, actuating further means to stop the timer.

Apparatus for carrying out the method according to the invention comprises a structure adapted to be suspended in a liquid and including guides defining a straight path, vanes on said structure acted on by a current in the liquid to maintain said straight path horizontal and aligned with said current, means for releasing bodies of a specifc gravity substantially equal to that of the liquid one-by-one into the upstream end of the said path, said bodies being restrained by the guides to follow said straight path but travelling freely therein, timing means brought into operation simultaneously with the operation of said releasing means, and means operated by said bodies after travelling a predetermined distance from their point of release to stop said timing means.

The bodies are preferably balls.

A magazine may be provided from which the bodies are released one-by-one into the path defined by the guides, and a net may be provided to collect the said bodies at the other end of the path.

The invention is hereinafter described with reference to the accompanying drawings, in which:

FIGURE 1 is a general illustration of one form of apparatus according to the invention, the structure including the guide path being shown in perspective and the control panel in elevation;

FIGURE 2 is a cross-section on a larger scale, of the said structure at the position occupied by stop members controlling the release of the travelling bodies;

FIGURE 3 is a detail view, also on a larger scale than FIGURE 1 showing a latch mechanism for the said stop members;

FIGURE 4 is an enlarged perspective view of a part of the mechanism shown in FIGURE 1;

FIGURE 5 is a perspective view of the means actuated by the bodies to stop the timing means; and FIGURE 6 shows a weighted follower for use in the magazine in which the bodies are housed before they are released to travel along the guide path.

Referring to the drawings, and particularly to FIGURE 1 thereof, the apparatus comprises a structure 10 capable of being suspended in water or another liquid, for example by means of a chain attached by a swivel (not shown) to a bar 11 thereon. The structure 10 and a control navel 12 include a straight guide path 13, means to release balls 14 from a magazine 15 at one end of the said structure into the guide path, a net 16 to collect the said balls at the other end of the guide path, electrical control means 17 for said ball-releasing means, and switch means 18 actuated by the balls at a predetermined point, just before they reach the end of the guide path. The control panel 12 carries a timer in the form of a stop-watch 19, switch mechanism 21 for initiating a ball release and starting the timer, and means in the form of a solenoid 22, for stopping the timer in response to operation of the switch means 18.

The structure 10 comprises four light metal girders 23 of T-section, supported in rings 24 with the webs constituted by the stems of the T's pointing inwardly so as to define the straight guide path 13. As shown in FIGURE 2, the balls 14 are a loose fit between the girders 23 so that they can travel freely along the guide path with very little friction. The bar 11 is secured to the girders by struts 25 one of which helps to support a vertical vane 26 adjacent one end of the structure. A pair of horizontal vanes, one of which is shown at 27, are provided adjacent the vertical vane 26, and a housing 28 forming a continuation of the vertical vane and extending to the end of the structure accommodates the switch means 18. The net 16 is mounted at this end of the structure.

The magazine 15, which is in the form of an inclined tube having a downward curve at one end, has that end supported just above the end of the guide path remote from the net 16, the upper part of the tube being supported by the other strut 25.

The ball-releasing means comprise a platform 29 pivoted at 30 about an axis transverse to the guide path and carrying two dependent rods 31 which extend downwardly across the guide path just downstream of the mouth of the magazine, being guided by brackets 32 (FIGURE 2) fixed to two of the girders 23. The rods 31 are on the downstream side of the pivot 30 of the platform 29 and, on the opposite side of its pivot, the platform carries a toothed segment 33 (FIGURE 4) meshing with an idler pinion 34 which in turn meshes with a pinion 35 fixed to a spindle 36 extending transversely of the guide path and supported in brackets 37 one on each side thereof. Fixed to the spindle 36 is a socket member 38 which has pivoted to it, one at each end, two rods 39 and 41 projecting horizontally through guides, one above the other, into the lower end of the magazine. The spacing of the rods 39 and 41 is slightly greater than the diameter of the balls 14. A light blade spring 42 attached to the rod 39 extends into the magazine just below the said rod.

The electrical control means 17 comprises a solenoid which, when energized, pulls up an armature 43 to lift the downstream end of the platform 29, which is so weighted that that end normally tends to move downwardly to a limit position in which it is supported by a fixed stop, not shown. The solenoid armature 43 carries a rod 44 passing through an aperture in a projection 45 on the platform, the rod 44 being formed with a ball head 46 which, when the armature is pulled up, engages the projection 45 to lift the platform. The armature 43 has lost motion relative to the platform. A latch member 47, pivoted at 48 on the structure 10 so as to rock about an axis longitudinal with respect to the said structure is formed with an aperture 49 to receive a pin 50 on the side of the platform to hold it in its normal position the latch member 47 being lifted to release the pin 50 from the hole 49 by the armature 43 during its lost motion relative to the platform. A flange 51 on the said armature engages the underside of the latch member to lift it. The latch member is returned to its engaged position by a spring (not shown).

The switch means 18 actuated by the balls 14 after they have travelled a predetermined distance along the guide path comprises a set of contacts (not shown) enclosed in a sealed box 52 (FIGURES 1 and 5), one of the contacts being mounted on a pivoted lever carrying a magnet which cooperates with an external magnet 53 in such a way that, by bringing the magnet 53 into a predetermined position outside the box it attracts the internal magnet and closes the switch. The sealed box 52 is rigidly secured to the structure including the girders 23, and to one of its end plates there is rigidly secured an upright channel member 54 having fixed to its upper end a horizontal bar 55 extending parallel to the length of the guide path. To one end of the bar 55 are pivoted a pair of links 56 (FIGURE 5) carrying the external magnet 53. On the opposite side of the channel member 54 there is pivoted to the bar 55, at 60, a rocking member 57 having two dependent arms 58, 59 to one of which 58, there is pivotally attached a thrust member 61 cooperating with the external magnet 53.

An L-shaped arm 62 pivoted at the point 63 part-way along its longer arm, to the lower end of the channel member 54 has a roller 64 mounted at its elbow, which roller lies in the path of the balls 14 so that it is knocked upwardly each time a ball passes it. A chain 65 forms a tension connection between a link 66 fixed to the shorter limb 67 of the arm 62 and the arm 59 of the rocking member 57. A rod 68, coupled to the said limb 67 and guided in a slot 69 in the bar 55, carries a resilient curved striker 71 which, when the rod 68 moves upwardly, strikes the arm 59 of the rocking member 57 to urge it upwardly.

A ball passing under the roller, however, lifts it, slackening the chain 65 and causing the striker 71 to give an upward kick to the arm 59 of the rocking member 57. The rocking member 57 therefore pivots in an anticlockwise direction as seen in FIGURE 5, withdrawing the thrust member 61 from the magnet 53 which thus moves downwardly in an arcuate path into contact with the wall of the box 52, taking up a position directly opposite the internal magnet, which it then attracts to close the switch.

An adjustable counterweight is provided at 72 on the longer limb of the arm 62, and a second adjustable counterweight 73 is provided on the rod 68, the said rod being screw-threaded and the striker 71 and counterweight 73 being located therein by nuts so that their positions can be adjusted. The counterweights are adjusted so that the moving system including the arm 62, rod 68 and chain 65 is very nearly in balance, but there is a slight tendency for the roller 64 to move downwardly when unsupported.

When the said roller is unsupported the rocking member 57 is held by the chain 65 in the position shown in FIGURE 5, the thrust member 61 supporting the magnet 53 in a position spaced from the wall of the box 52, so that it provides insufficient force to attract the internal magnet, and the switch is open.

The control panel 12, as shown in FIGURE 1, has the switch mechanism 21 in the form of a group of resilient switch blades 74 brought into contact one with another by anticlockwise movement of a switch arm 75 about its pivot at 76, the said switch arm being coupled by a link 77 to another pivoted arm 78 one end of which is connected to the armature 79 of the solenoid 22. The switch arm 75 also carries, on a lateral extension 81 thereof, a roller 82 acting on a cam arm 83 pivoted at 84, so that, when the switch arm 75 moves about its pivot at 76 from the position shown in FIGURE 1, in which the switch is open, anticlockwise to a position in which the switch is closed, the cam arm 83 is free to pivot upwardly, allowing a plunger 85 also to rise and release the control member of the stop-watch 19 so that the watch is permitted to start.

The switch mechanism 21, when closed, connects the solenoid 17 to a battery (not shown) with the terminals of which a connection is made by the crocodile clips 86, and also includes contacts in the circuit of the solenoid 22, in series with the switch 18, so that the circuit of the solenoid 22 is closed when the switch 18 is closed. The solenoid 22, when energized, rocks the arm 78 about its pivot to open both sets of contacts of the switch 21.

Owing to the fact that the balls 14 are of substantially the same specific gravity as the water, they tend to float in the magazine and do not readily pass down into the guide path 14. To ensure that they do enter the guide path, a weighted follower 87 (FIGURE 6) is placed in the magazine 15, the said follower comprising two hemispheres secured to opposite sides of a flat bar 88 which projects through a slot 89 in the magazine and enables the follower to be manipulated easily. A cross-pin 91 in the bar 88 prevents it from falling into the magazine.

The apparatus according to the invention operates in the following manner.

The magazine 15 is located with balls 14, of which the lowermost is supported by the rod 39, since the platform 29 is in its normal position and the rod 39 therefore projects across the lower end of the magazine. By closing and then opening the switch 21, the platform 29 is lifted by the solenoid of the control means 17 and then released.

The lifting causes the rod 39 to be retracted so that the lowermost ball 14 falls on to the rod 41, and the lowering of the platform when it is released causes the rod 39 to move into position under the next ball 14, and withdraws the rod 41 so that the lowermost ball 14 drops into the guide path, being prevented from moving along the said path by the rods 31.

The apparatus is then lowered into the water at the place and to the depth where the current is to be measured. At predetermined intervals, the switch 21 is closed by moving down the switch arm 75 anticlockwise about its pivot at 76, thus energising the solenoid at 17 to lift the platform 29 and release a ball, at the same time allowing a second ball to drop on to the rod 41 and starting the stop-watch 19.

The released ball 14 travels along the guide path until, just before it passes into the net 16, it lifts the roller 64, causing the switch 18 to be closed and energising the solenoid 22 which moves the switch arm 75 clockwise through the intermediary of the arm 78 to open the switch 21 and stop the stopwatch. The opening of the switch 21 also deenergises the solenoid at 17 so that the platform 29 falls to its normal position, allowing the next ball to drop into the guide path where it is held by the rods 31 ready for the next releasing operation. The latch member 47 is automatically released and reengaged each time the platform is lifted and lowered.

When each ball has passed the roller 64, the latter drops and applies a pull through the chain 65 to the rocking member 57, causing the thrust member 61 to push the magnet 53 along the surface of the box 52 away from the internal magnet, thus reducing the attraction between the magnets until the internal one falls away and the coupling is broken, allowing the switch 18 to open.

The length of the guide path being known, all that is necessary is to read the stop-watch to enable the speed of the current to be calculated.

The balls 14 may be solid or hollow, depending on the material from which they are made, but in all cases have substantially the same specific gravity as the liquid in which they are to be used.

A preferred form of ball is a rigid hollow spherical shell of plastics material perforated with a large number of small holes, so that it displaces very little liquid.

Such a ball, moreover, would not be subject to deformation by compression if used at great depths.

I claim:

1. Apparatus for measuring the rate of flow of a liquid comprising a structure adapted to be suspended in a liquid guide means carried by said structure and defining a straight path, vanes on said structure adapted to be acted on by a current in the liquid to maintain said guide means and the path defined thereby horizontal and aligned with said current, means for releasing bodies of a specific gravity substantially equal to that of the liquid one-by-one into the upstream end of said path said bodies being restrained by said guide means to follow said straight path but travelling freely therein, timing means adapted to be brought into operation simultaneously with the operation of said releasing means, and means operated by said bodies after travelling a predetermined distance from their point of release, to stop said timing means.

2. Apparatus according to claim 1, wherein the said bodies are balls.

3. Apparatus according to claim 1, wherein a magazine is provided from which said bodies are released one-by-one into the path defined by said guide means, and a net is provided to collect the said bodies at the other end of the path.

4. Apparatus according to claim 1, wherein electrical means are provided to start and to stop the timing means.

5. Apparatus according to claim 4 wherein said electrical means comprise switch means, a solenoid actuating ball releasing means upon manual closing of said switch means and a second solenoid acting, when energized, to open said switch means, the circuit of said second solenoid including a switch operated by each of said bodies after it has travelled a predetermined distance along the straight path and contacts in said switch means, the starting and stopping of the timing means being effected by a member movable to close and open the said switch means.

6. Apparatus according to claim 5 wherein the switch operated by the bodies is mounted in a sealed box on the structure and is operated by the bodies through a magnetic coupling device.

7. Apparatus according to claim 3, wherein electrical means are provided to start and to stop the timing means.

8. Apparatus according to claim 7, wherein said electrical means comprise switch means, a solenoid actuating ball releasing means upon manual closing of said switch means and a second solenoid acting, when energized, to open said switch means, the circuit of said second solenoid including a switch operated by each of said bodies after it has traveled a predetermined distance along the straight path and contacts in said switch means, the starting and stopping of the timing means being effected by a member movable to close and open the said switch means.

9. Apparatus according to claim 8, wherein the switch operated by the bodies is mounted in a sealed box on the structure and is operated by the bodies through a magnetic coupling device.

References Cited

UNITED STATES PATENTS

| | | | |
|---|---|---|---|
| 455,571 | 7/1891 | Menzie | 73—194X |
| 3,224,247 | 12/1965 | Barrett | 73—3 |
| 3,232,090 | 2/1966 | Walker | 73—3 |

FOREIGN PATENTS

| | | |
|---|---|---|
| 895,365 | 5/1962 | Great Britain. |

RICHARD C. QUEISSER, *Primary Examiner.*

EDWARD D. GILHOOLY, *Assistant Examiner.*